United States Patent
Steudtner (10) Patent No.: US 9,584,192 B2
(45) Date of Patent: Feb. 28, 2017

(54) METHOD AND DEVICE FOR TRANSMITTING ELECTRIC POWER AND SIGNALS BETWEEN A STATIONARY WALL AND A LEAF PIVOTABLY MOUNTED ON SAID WALL

(71) Applicant: DR. HAHN GMBH & CO. KG, Moenchengladbach-Wickrath (DE)

(72) Inventor: Joachim Steudtner, Selbitz (DE)

(73) Assignee: DR. HAHN GMBH & CO. KG, Moenchengladbach-Wickrath (DE)

( * ) Notice: Subject to any disclaimer, the term of this patent is extended or adjusted under 35 U.S.C. 154(b) by 0 days.

(21) Appl. No.: 14/653,269

(22) PCT Filed: Dec. 6, 2013

(86) PCT No.: PCT/EP2013/075784
§ 371 (c)(1),
(2) Date: Jun. 18, 2015

(87) PCT Pub. No.: WO2014/095421
PCT Pub. Date: Jun. 26, 2014

(65) Prior Publication Data
US 2015/0333795 A1    Nov. 19, 2015

(30) Foreign Application Priority Data
Dec. 21, 2012  (DE) .......................... 10 2012 112 854

(51) Int. Cl.
*H04B 10/80*  (2013.01)
*H04B 5/00*  (2006.01)
*E05D 11/00*  (2006.01)
*H02J 5/00*  (2016.01)
*H02J 7/02*  (2016.01)

(52) U.S. Cl.
CPC ......... *H04B 5/005* (2013.01); *E05D 11/0081* (2013.01); *H04B 5/0037* (2013.01); *H04B 10/807* (2013.01); *E05Y 2400/66* (2013.01); *E05Y 2400/662* (2013.01); *E05Y 2800/00* (2013.01); *H02J 5/005* (2013.01); *H02J 7/025* (2013.01)

(58) Field of Classification Search
CPC .... H04B 5/005; H04B 5/0037; H04B 10/807; E05D 11/0081; E05Y 2800/00; E05Y 2400/66; E05Y 2400/662; H02J 7/025; H02J 5/005
USPC ........................................................ 398/114
See application file for complete search history.

(56) References Cited

U.S. PATENT DOCUMENTS

| 2012/0051753 A1* | 3/2012 | Labonville | ............... B25J 13/02 |
| | | | 398/114 |
| 2014/0001878 A1* | 1/2014 | Meyer | .................. E05D 11/0081 |
| | | | 307/104 |

(Continued)

FOREIGN PATENT DOCUMENTS

| DE | 39 15 812 A1 | 11/1990 |
| DE | 43 44 071 A1 | 7/1995 |

(Continued)

*Primary Examiner* — Leslie Pascal
(74) *Attorney, Agent, or Firm* — Norman B. Thot (57) ABSTRACT

A method for transmitting electric power and signals between a wall and a leaf pivotally mounted on the wall includes transmitting the electric power so as to be galvanically isolated, and transmitting the signals optically or optoelectronically.

10 Claims, 5 Drawing Sheets

(56) References Cited

U.S. PATENT DOCUMENTS

2014/0339903 A1* 11/2014 Goma .................... H02J 7/025
                                                                          307/85
2014/0345084 A1    11/2014  Herglotz et al.
2015/0130287 A1     5/2015  Steudtner et al.

FOREIGN PATENT DOCUMENTS

| DE | 102010061471 A1 * | 6/2012 | ......... E05D 11/0081 |
| --- | --- | --- | --- |
| DE | 10 2011 050 342 A1 | 11/2012 | |
| DE | 20 2011 052 457 U1 | 3/2013 | |
| EP | 0 908 594 A2 | 4/1999 | |
| JP | WO 2013125091 A1 * | 8/2013 | .............. H02J 7/025 |

* cited by examiner

METHOD AND DEVICE FOR TRANSMITTING ELECTRIC POWER AND SIGNALS BETWEEN A STATIONARY WALL AND A LEAF PIVOTABLY MOUNTED ON SAID WALL

CROSS REFERENCE TO PRIOR APPLICATIONS

This application is a U.S. National Phase application under 35 U.S.C. §371 of International Application No. PCT/EP2013/075784, filed on Dec. 6, 2013 and which claims benefit to German Patent Application No. 10 2012 112 854.5, filed on Dec. 21, 2012. The International Application was published in German on Jun. 26, 2014 as WO 2014/095421 A1 under PCT Article 21(2).

FIELD

The present invention relates to a method and a device for transmitting electric power and signals between a stationary wall and a leaf pivotally mounted on the wall, wherein the electric signal is galvanically isolated, and is in particular inductively transmitted.

BACKGROUND

Such a method and such a device have previously been described in DE 39 15 812 A1. DE 39, 15 812 A1 describes concentrically disposed coils or a cylindrically formed capacitor for power transmission. A signal transmission may likewise occur by means of the coils or the capacitor or via radio.

The disadvantage here is that during the transmission of signals by means of this same assembly, which is also used for the power transmission, a mutual influence on the transmission cannot be excluded. An optimized power transmission also regularly requires a different design adaptation of the coils and the capacitor as an optimized signal transmission so that the use of this very same assembly of transmitters can only ever be a less than optimal compromise.

If the signal is transmitted via radio, the device for power transmission may in principle indeed be optimally designed for this purpose. Radio transmission is, however, frequently susceptible to external interference and can be influenced with appropriate means by way of external transmitters, which is particularly disadvantageous with regard to security-related signals.

SUMMARY

An aspect of the present invention is to provide an improved method and an improved device for transmitting electric power and signals between a stationary wall and a leaf pivotably mounted on the wall.

In an embodiment, the present invention provides a method for transmitting electric power and signals between a wall and a leaf pivotally mounted on the wall which includes transmitting the electric power so as to be galvanically isolated, and transmitting the signals optically or optoelectronically. The present invention also provides a device for transmitting electric power and signals between a wall and a leaf pivotally mounted about a hinge axis on the wall which includes a power transmission apparatus configured to galvanically isolate a transmission of the electric power, and a signal transmission apparatus configured to transmit at least one of an optical signal and an optoelectronic signal.

BRIEF DESCRIPTION OF THE DRAWINGS

The present invention is described in greater detail below on the basis of embodiments and of the drawings in which.

DETAILED DESCRIPTION

In the method according to the present invention, the signals are transmitted optically or optoelectronically between the wall and the leaf. The optical or optoelectronic transmission allows for very high data transfer rates so that the signal transmission may also be carried out digitally with high resolution. In contrast to radio transmission, optical or optoelectronic transmissions may also easily be completely outwardly shielded so that they are immune to external interference or tampering. An optical or optoelectronic signal transmission is lastly characterized by a very low power requirement so that the electric power to be provided specifically for signal transmission is comparatively low.

In an embodiment of the method according to the present invention, the electric power is transmitted from a primary to a secondary side, and the signals are transmitted from the secondary to the primary side.

The signals may be those which transmit the power demand from the anticipated secondary side consumer to the primary side so as to create a control loop which provides that, apart from losses from galvanically isolated transmission, only that electric power is conducted which the consumer needs. The function of the control loop may be purely analog, that is, the power demand may be transmitted dependent on the intensity of the optically or optoelectronically transmitted electromagnetic radiation.

The signals can serve to transmit operational and/or signal statuses from secondary side sensors, detectors or detector groups, for example, to a primary side alarm system. If only such signals are transmitted from the secondary side to the primary side via the method according to the present invention, only such power is, for example, kept by the primary side as is sufficient to operate the sensors, detectors or detector groups. No need for a control loop exists.

In an embodiment of the present invention, the primary side can, for example, be the wall side, and the secondary side can, for example, be the leaf side. Sufficient electric power through a power connection is usually available on the wall side via most existing power connections. Routinely present on the leaf side are sensors, detectors or detector groups, such as glass break sensors, closure sensors, etc., the signals of which must be utilized by a stationary, i.e., wall side, alarm system.

In an embodiment of the method according to the present invention, a direct current voltage can, for example, be made available on the primary side, which direct current voltage is then converted into an alternating current voltage having a frequency, for example, of between 10 and 300 kHz, to be used for the galvanically isolated inductive transmission. This direct current voltage can be provided by a power supply of an alarm system which is buffered by a battery or accumulator. Interruption-free execution of the method is thereby provided as long as the alarm system can be operated. The direct current voltage can be converted into alternating current voltage using, for example, a power MOSFET switch, which can be power controlled, for example, by a pulse width or a pulse phase control.

In an embodiment of the present invention, the primary and secondary coil assemblies can, for example, have an identical construction. Their impedance and their housing and core material are optimized for the operating frequency and the maximum power to be transmitted.

The device according to the present invention for transmitting electric power and signals between a stationary wall and a leaf mounted pivotally about a hinge axis on the wall comprises a power transmission apparatus for galvanically isolated transmission of the electric power. An optical or optoelectronic signal transmission apparatus is provided according to the present invention.

The power transmission apparatus can, for example, comprise a primary and a secondary coil arrangement.

The signal transmission apparatus can, for example, comprise a light emitting diode (LED) and a photodiode or a phototransistor.

In order to effect a power transmission with minimal loss and a signal transfer which is as reliable as possible, the coil assemblies and the signal transmission apparatus are designed so that they each have a central axis, and are arranged so that the central axes approximately coincide with the hinge axis. During a pivoting movement of the leaf about the hinge axis, the coil assembly and the components of the signal transmission apparatus, for example, the light emitting diode and the phototransistor, merely rotate relative to one another, and otherwise do not shift their positions with respect to one another. The primary and secondary coil assemblies can, for example, have an identical construction. Their impedance and their housing and core material are optimized for the operating frequency and the maximum power to be transmitted.

In an embodiment, the device according to the present invention comprises a first power transmission apparatus for providing need-based electric power for leaf side consumers. Examples of leaf side consumers include motorized locks, lighting, etc. These consumers should be provided with the power required for their function by the power transmission apparatus. The primary power with which the primary coil assembly is acted on is thus adjusted to the particular leaf side power requirements.

To accomplish this adjustment, this embodiment can, for example, comprise a first signal transmission apparatus to control the electric power which is provided by the first power transmission apparatus for leaf side consumers. Via this first signal transmission apparatus, a control circuit is created which provides that, apart from losses in the power transmission apparatus and in the operation of these provided electronic circuits themselves, only so much power flows into the primary side of the power transmission apparatus as will be delivered to the leaf side consumer. The necessary control can, for example, be purely analog, and can, for example, be effected via a pulse width control or via a pulse phase control.

This embodiment of the device according to the present invention also comprises a second power transmission apparatus for providing the necessary power for the operation of sensors, detectors or detector groups. This second power transmission apparatus may likewise comprise primary and secondary side coil assemblies, wherein the primary coil assembly is disposed in turn on the wall side, and the secondary coil assembly is disposed on the leaf side. As sensors, detectors and detector groups routinely have substantially lower power requirements compared with consumers such as motorized locks, lighting, etc., and this power requirement is substantially constant, a control circuit for controlling the primary power by which the second power transmission apparatus is acted upon may therefore be dispensed with. The primary and secondary coil assemblies can, for example, have an identical construction. Their impedance and their housing and core material are optimized for the operating frequency and the maximum power to be transmitted.

This embodiment of the device according to the present invention also comprises a second signal transmission apparatus. This only serves, however, to transmit operational and/or signal statuses from the secondary side sensors, detectors or detector groups to a primary side, i.e., wall side, alarm system.

The separation of the power transmission necessary for operation of the sensors, detectors or detector groups from the power transmission for the further, leaf side consumers has the advantage, among others, that interferences possibly resulting from sudden power fluctuations may be avoided. A less powerful, but therefore, for example, more robust and longer-lasting, accumulator or battery backed primary voltage source may also be provided on the primary, i.e., wall side, thereby increasing the operational reliability achievable with the device according to the present invention.

The present invention will now be further illustrated with reference to drawings in which an exemplary embodiment of a device according to the present invention is shown.

Figure 1:
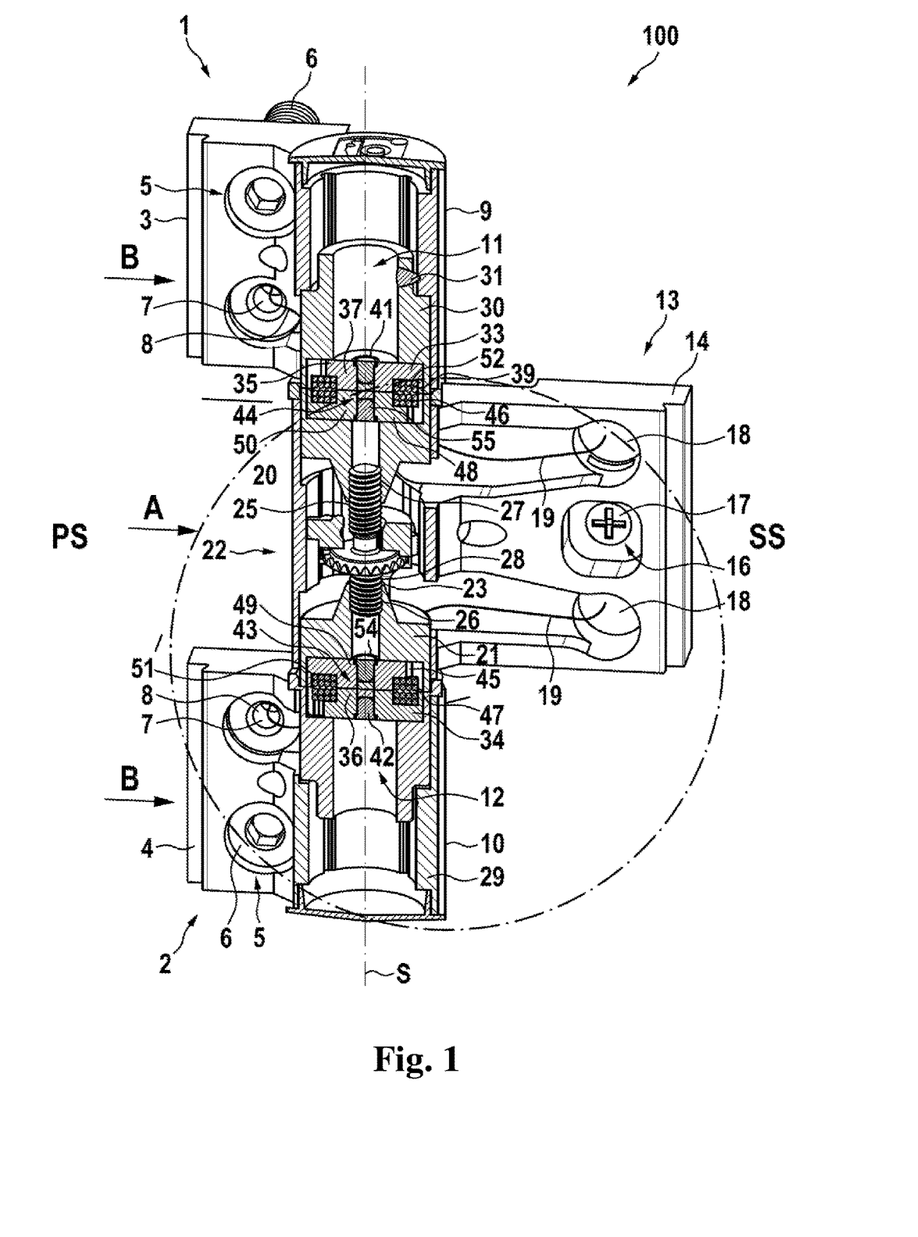
FIG. 1 shows an exemplary embodiment of the device according to the present invention in partial longitudinal section.

The device in FIG. 1, designated as a whole by reference numeral 100, comprises two wall members 1, 2, which can be attached apart from one another along the direction of a hinge axis S to a wall having a door or window opening (which is not represented in the drawings). The preceding or subsequent use of the term "wall" includes a frame or trim, which is usually provided in the area of a door or window opening on a wall.

The wall members 1, 2 comprise attachment members 3, 4. Each attachment member 3, 4 has a hole 5 for receiving a fastening screw 6, and a hole 7 for passing through electrical and/or optical cables 8, which are merely indicated in FIG. 1 and which establish the electric or optical connection from the power or signal transmitters to the associated electronic or optoelectronic circuits, as will be described in more detail below.

The wall typically forms a primary side PS, from which electric power is transferred to the leaf, which is the secondary side SS.

Respective receiving members 9, 10 for receiving components from power and signal transmission apparatuses 11, 12 are integrally formed on each attachment member 3, 4.

The device 100 also comprises a leaf member 13, which is disposed between the two wall members 1, 2. The leaf member 13 likewise comprises an attachment member 14 and a receiving member 15 integrally formed on the attachment member 14. Provided on the attachment member 14 is a hole 16 for a fastening screw 17, with which the leaf member 13 is mountable on a leaf (which is not represented in the drawings). The attachment member 14 also has holes 18 which serve in the conveyance of electrical and/or optical cables 19, which once again are represented only schematically in the drawing. These cables 19 serve to connect the power and signal transmission apparatuses 11, 12 with leaf side electronic or optoelectronic circuits.

The receiving member 15 also serves to receive leaf side components of the power and signal transmission apparatuses 11, 12. These leaf side components comprise two bearing sleeves 20, 21 which are spaced apart from one another along the direction of the hinge axis S and are mounted movably with respect to each other in this direction. A spindle drive 22 is used for shifting and fixing in a desired position. The spindle drive 22 comprises an adjusting spindle 23 which comprises a face gear 24 in the center. This face gear 24 is used for the selective attachment of a turning tool (which is not represented in the drawings), or for the engagement of a rotary actuator apparatus (which is also not represented in the drawings). The adjusting spindle 23 also has two threaded portions 25, 26, which comprise outer threads oriented in opposite directions. The threaded portions 25, 26 engage with complementary internal threads 27, 28 of the bearing sleeves 20, 21. The bearing sleeves 20, 21 can thus be shifted in the direction of the hinge axis by rotary action of the spindle drive 22 so as to be adjusted between a mounting position, in which the bearing sleeves 20, 21 have a minimal distance from one another, and an operating position, in which the bearing sleeves 20, 21 almost touch the bearing sleeves 29, 30 in the receiving members 9, 10 of the wall members 1, 2.

Figure 2:
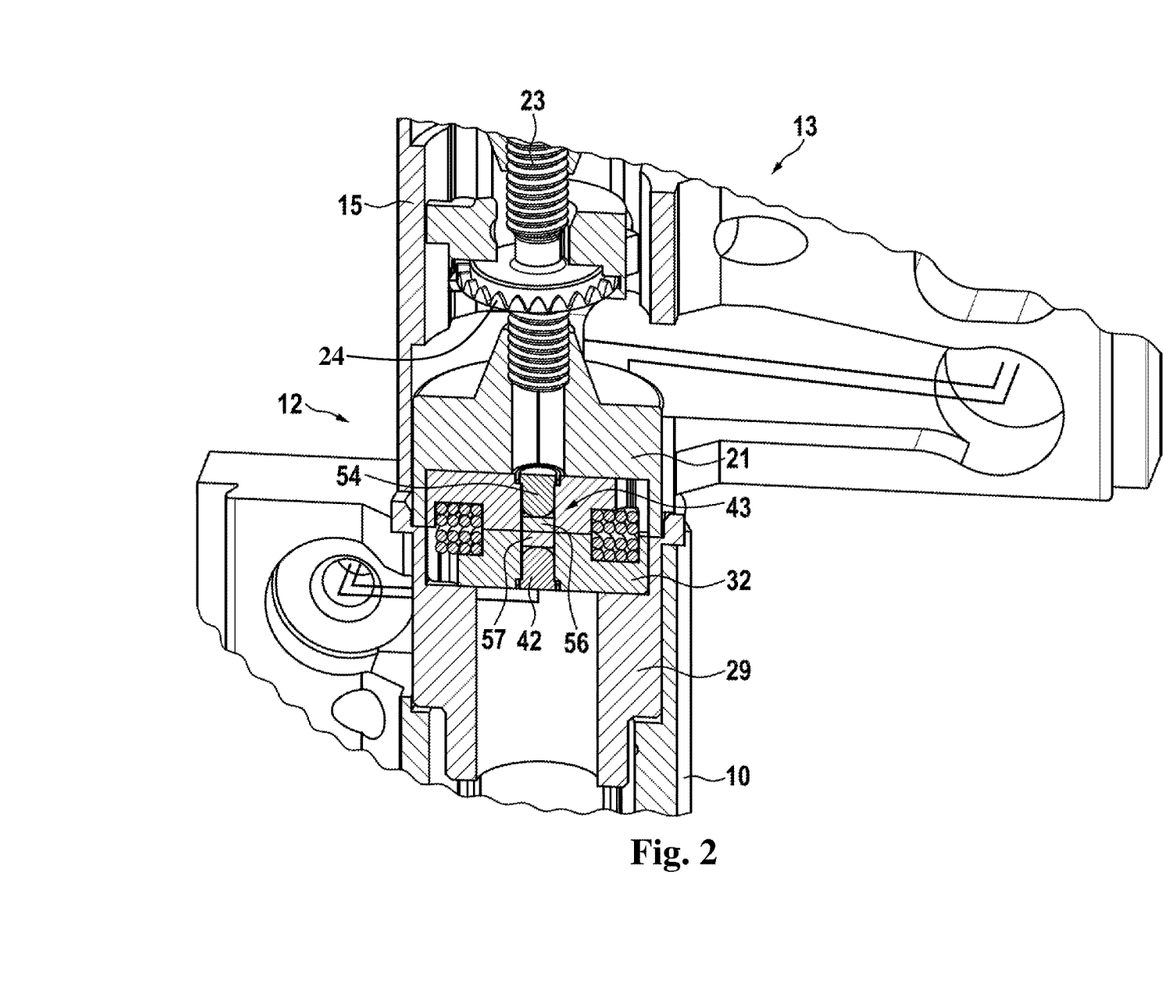
FIG. 2 shows detail A in FIG. 1 in an enlarged view.

The construction and mode of operation of the power and signal transmission apparatuses 11, 12 will now be explained with reference to FIGS. 2 and 3, in which the signal transmission apparatus 12 in the lower portion of FIG. 1 may be recognized.

In addition to the bearing sleeve 21, which is slidably mounted in the receiving member 15 of the leaf member 13 by the actuating spindle 23, the power and signal transmission apparatus 12 comprises the bearing sleeve 29, which is disposed in the receiving member 10. The functionally corresponding bearing sleeve 30 is also disposed in the receiving member 9 of the upper wall member 1. Displaceability of the bearing sleeves 29, 30 in the direction of the hinge axis S is not provided. The upper bearing sleeve 30 comprises a radially projecting clamping apparatus 31, so as not to automatically fall out after a possible removal of the leaf portion 13.

A primary coil assembly, 32, 33 is inserted into the bearing sleeve 29, 30, respectively. Each primary coil assembly 32, 33 comprises a coil housing 34, 35 made of a soft magnetic, particularly ferritic material. The coil housings 34, 35 have a central core 36, 37, around which the coil windings 38, 39 are led. A central hole 40 is provided in each core 36, 37. The central hole 40 is used for receiving a phototransistor 41, 42, respectively, which is part of the secondary member of an optoelectronic signal transmission apparatus 43, 44, respectively.

A secondary coil assembly, 45, 46 is disposed in the bearing sleeve 20, 21, respectively. The secondary coil assembly 45, 46 comprises in each case a coil housing 47, 48 having a core 49, 50 around which the secondary coil winding 51, 52 is wound.

The coil housing 47, 48 has in turn a central bore 53, extending through the respective core 49, 50. The central bore 53 serves to accommodate in each case a light emitting diode (LED) 54, 55, which need not necessarily operate within the visible light range, but which is adjusted to the respective phototransistor 41, 42 with regard to the wavelength of the emitted electromagnetic radiation (visible or invisible light).

The light emitting diodes 54, 55 belong to the respective primary parts of the signal transmission apparatus 43, 44.

To improve the optical coupling of the light emitting diodes 54, 55 to the respective phototransistor 41, 42, optical fibers 56, 57 are provided which are inserted from the mutually facing sides of the coil housing into the central holes 40, 53, and are flush with the mutually facing sides of the coil housing.

Figure 3:
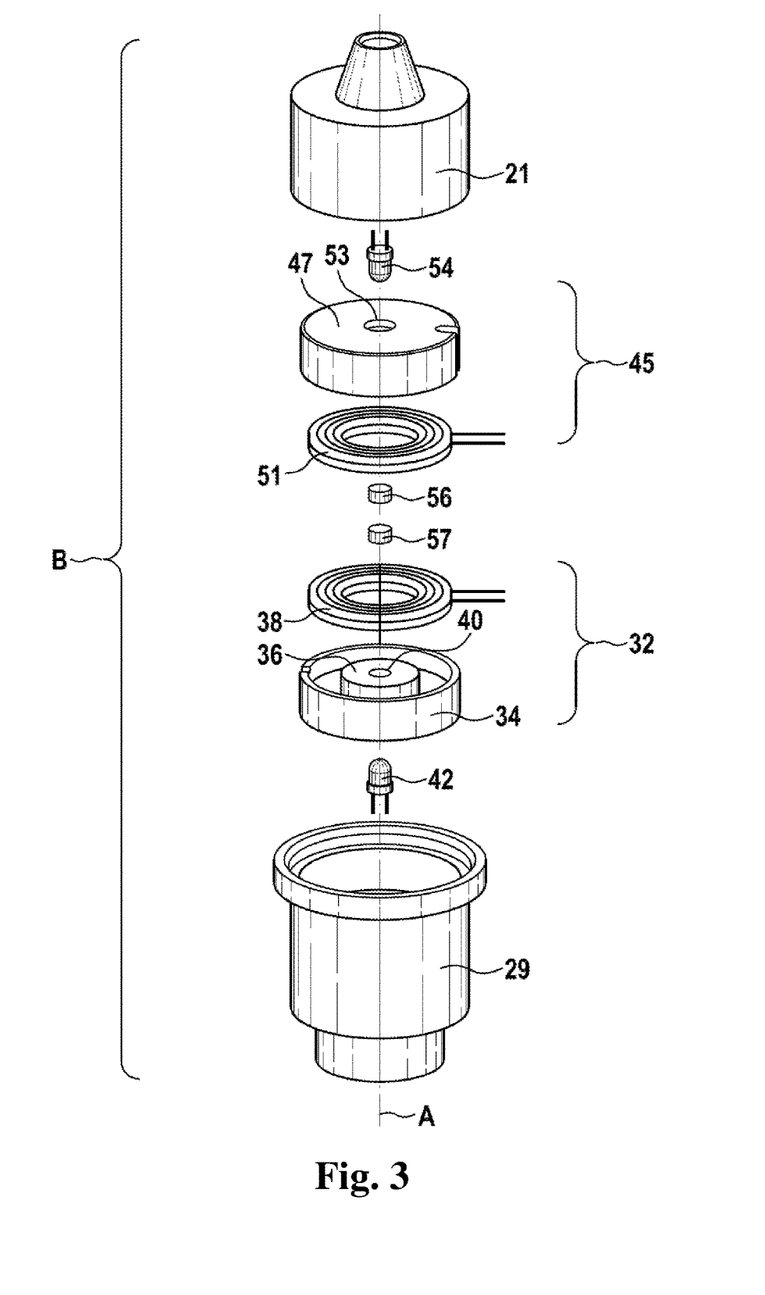
FIG. 3 shows an exploded perspective view of an assembly which comprises a power transmission apparatus as well as a signal transmission apparatus.

As can be seen in FIG. 3, the coil assemblies and the signal transmission apparatuses are disposed symmetrically with respect to a central axis A. In the assembled state, this axis A coincides with the hinge axis S.

As can be seen in FIG. 1, the device according to the present invention has two of the assemblies B represented in FIG. 3, each comprising one apparatus for power transmission and one for signal transmission, whereby the two assemblies B are disposed opposite one another.

One of the assemblies B is part of an apparatus for providing on-demand electric power for leaf side consumers. For the sake of description, it will be assumed that this is the lower assembly B in FIG. 1. The primary coil assembly 32 and the phototransistor 42 are then connected to a primary power electronics system PLE, and the secondary coil assembly 45 and the light emitting diode 54 are connected to a secondary power electronics system SLE. The primary coil assembly 32 and the secondary coil assembly 45 are part of a first power transmission apparatus 96, and the primary coil assembly 33 and the secondary coil assembly 46 are part of a second power transmission apparatus 97. The basic structure of the primary and secondary electronics systems and their modes of operation are explained in more detail with reference to FIG. 4.

Figure 4:
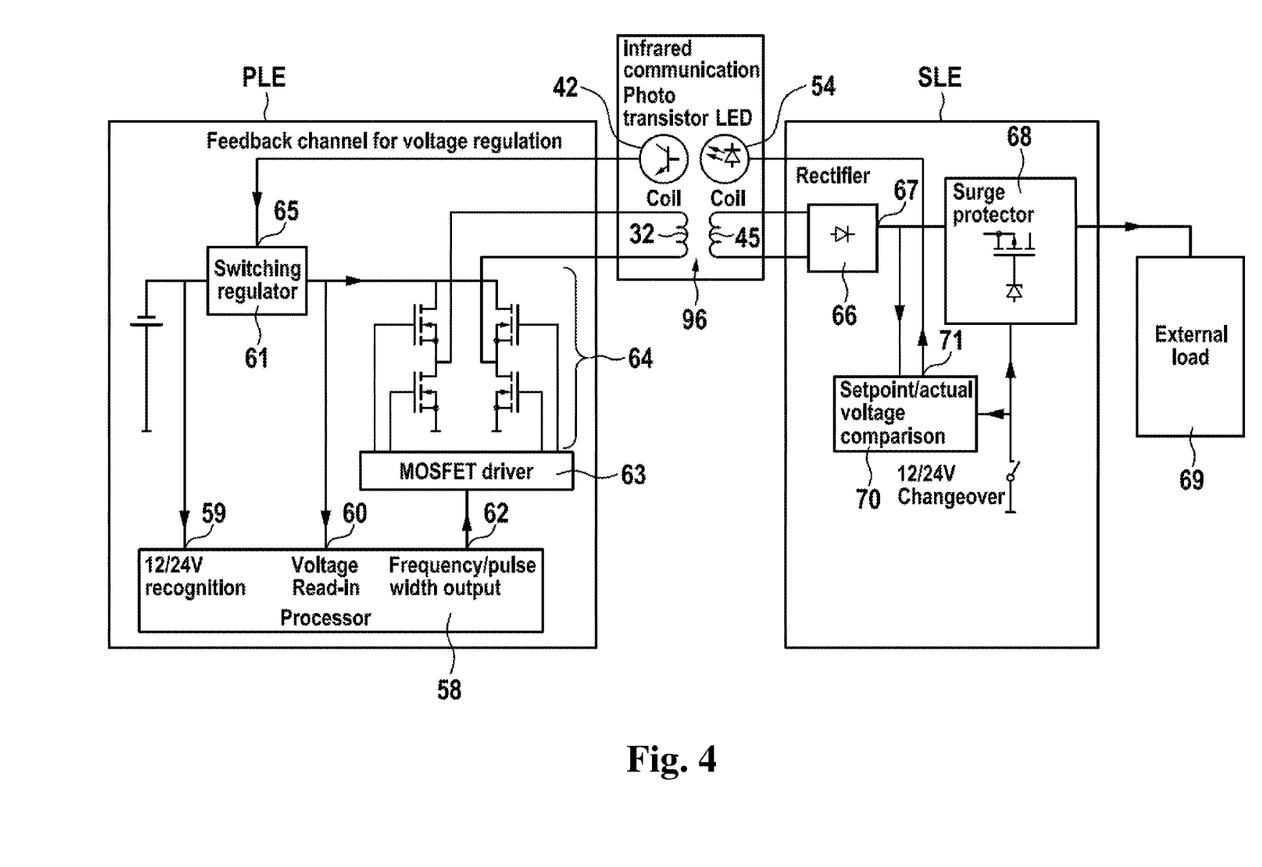
FIG. 4 shows a block diagram of an electrical circuit with which an assembly according to FIG. 3 is connected, where this is provided for the provision of electric power to leaf side consumers.

The primary power electronics system PLE comprises a processor 58, which via an input 59 is powered with a 12V or 24V direct current voltage that can be provided by the power supply of an alarm system.

The processor 58 also has an input 60, via which the voltage output by a switching regulator 61, which is supplied by the same voltage source, can be detected.

The processor 58 comprises an output 62 via which the processor 58 is connected to a driver 63 of a MOSFET power stage 64.

On the input side, the MOSFET power stage 64 is connected to the output of the switching regulator 61. The primary coil 32 is connected to the output of the MOSFET power stage 64.

The switching regulator 61 has a control input 65 via which the voltage that is output by the switching regulator 61 can be altered. The control input 65 is connected to the phototransistor 42.

The secondary power electronics system SLE comprises a rectifier 66, to whose input the secondary coil assembly 45 is connected. A leaf side consumer 69 is connected to the output 67 of the rectifier 66, with a surge protector 68 connected in between.

The secondary power electronics system SLE also includes an apparatus 70 for setpoint/actual value voltage comparison, which compares the voltage at the output 67 of the rectifier 66 (actual value) with a predetermined reference value (12V or 24V). The apparatus 70 comprises a signal output 71, to which the LED 54 is connected. The apparatus 70 generates a voltage signal at the signal output 71, which is applied analog to the LED 54 and determines the intensity of the emitted electromagnetic radiation, and is dependent on the setpoint/actual value difference. The signal is detected by the phototransistor 42, and a signal-dependent voltage value is transmitted to the control input 65 of the switching regulator 61.

A control circuit is created by means of the primary and the secondary power electronics systems PLE, SLE which provides that (apart from losses in the primary and secondary electronics as well as through the galvanically isolated transmission from the primary coil assembly 32 to the secondary coil assembly 35) only so much power of the primary coil assembly 32 is supplied from the MOSFET power stage 64 as will be delivered to the consumer 69.

Figure 5:
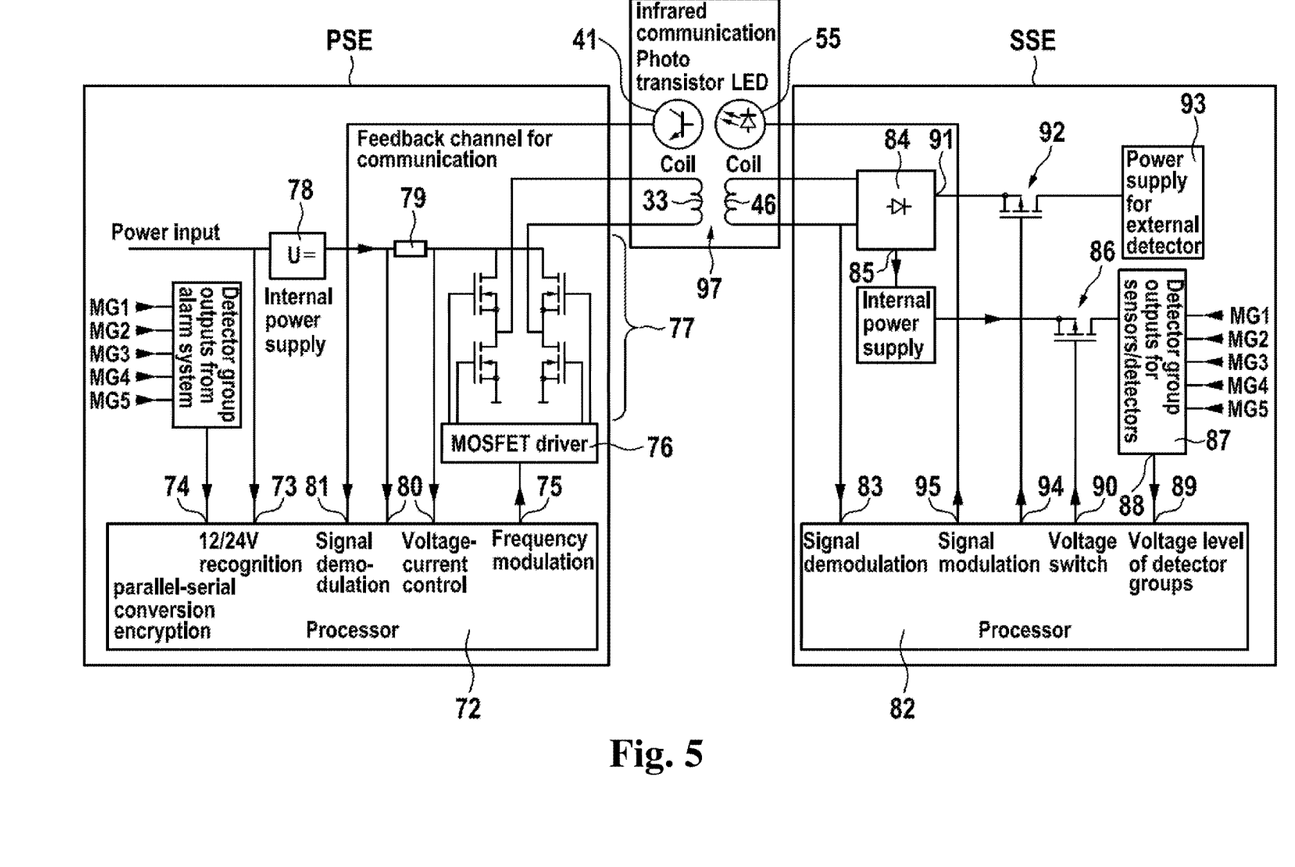
FIG. 5 shows a block diagram of an electrical circuit with which an assembly according to FIG. 3 is connected, where this is provided for the transmission of signals from leaf to wall.

The upper assembly B disposed in the device 100, which comprises the corresponding primary coil assembly 33 and the secondary coil assembly 46 as well as the phototransistor 41 and the LED 55, is part of a device for transmitting signals supplied by leaf side sensors, detectors or detector groups of an alarm system. A primary signal electronics system PSE and a secondary signal electronics system SSE are provided for this purpose.

The primary signal electronics system PSE comprises a processor 72, which has a supply voltage input 73 for applying a 12V or 24V supply voltage. The supply voltage is provided by an external power supply or by the alarm system.

The processor 72 further comprises a terminal 74 to which the detector group outputs of an alarm system are connected. The processor 72 converts the signals received from the detector device outputs into serial data, and encrypts them in order to effectively prevent unauthorized capture of these signals during the subsequent galvanically isolated transmission from the primary coil assembly 33 to the secondary coil assembly 46.

The processor 72 has an output 75 via which it is connected to a driver 76 of a MOSFET power stage 77. The frequency-modulated converted serial data are supplied to the MOSFET power stage 77 via the output 75 and the driver 76.

An internal power supply 78 is also attached to the MOSFET power stage 77. The MOSFET power stage 77 is connected to the primary coil assembly 33 on the output side. During operation, the primary coil assembly 33 is therefore acted on by an alternating current voltage, which is frequency-modulated according to the signals obtained from the outputs of alarm system detector groups.

The processor 72 further comprises inputs for voltage/current control which are connected to the terminals of an activated resistor 79 in the power supply line. The inputs are designated by reference numeral 80. A signal input 81 is lastly provided on the processor 72, to which the phototransistor 41 is attached.

The secondary signal electronics system SSE also has a processor 82, which comprises a signal input 83 to which the secondary coil assembly 46 is connected. The processor 82 detects the signals transmitted from the primary coil assembly 33 to the secondary coil assembly 46 via the signal input 83 via a corresponding signal demodulation of the voltage produced in the secondary coil assembly 46, which is likewise frequency-modulated voltage.

In order to operate leaf side sensors, detectors or detector groups of an alarm system, the secondary coil assembly 46 is attached to a rectifier 84. For this purpose, the rectifier 84 comprises an output 85 which is connected via a MOSFET 86 to a distributor 87 for acting on the sensors, detectors or detector groups with the supply voltage.

The distributor 87 has an output 88 which is connected to an input 89 of the processor 82, via which the processor 82 detects the sensors, detectors or detector groups via the supply voltage provided by the distributor 87.

Depending on the detected supply voltage, the processor 82 controls an output 90, which is attached to the gate of the MOSFET 86.

The rectifier 84 has a further output 91. The output 91 is attached to a power supply 93 for external detectors via a further MOSFET 92. The MOSFET 92 is in turn controlled by the processor 82 via an output 94 which is connected to the gate.

The processor 82 lastly includes a signal output 95 by which signals recognized by the sensors, detectors or detector groups are supplied in a suitably modulated state to the LED 55. The correspondingly modulated signals are received by the phototransistor 41 and made available via the terminal 74 to the processor 72 of the primary signal electronics system PSE, which suitably demodulates the signals and makes them available to the alarm system via the terminal 74.

The present invention is not limited to embodiments described herein; reference should be had to the appended claims.

LIST OF REFERENCE NUMERALS

100 Device
1, 2 Wall members
3, 4 Attachment members
5 Hole
6 Fastening screw
7 Holes
8 Cable
9, 10 Receiving members
11, 12 Power and signal transmission apparatuses
13 Leaf member
14 Attachment member
15 Receiving member
16 Hole
17 Fastening screw
18 Holes
19 Cable
20, 21 Bearing sleeves
22 Spindle drive
23 Adjusting spindle
24 Face gear
25, 26 Threaded portion
27, 28 Internal thread
29, 30 Bearing sleeve
31 Clamping apparatus
32, 33 Primary coil assembly
34, 35 Coil housing
36, 37 Core
38, 39 Coil windings
40 Central hole
41, 42 Phototransistor
43, 44 Signal transmission apparatus
45, 46 Secondary coil assembly
47, 48 Coil housing
49, 50 Core
51, 52 Secondary coil windings
53 Central hole
54, 55 Light emitting diode 56, 57 Optical fibers
58 Processor
59 Input
60 Input
61 Switching regulator
62 Output
63 Driver
64 MOSFET power stage
65 Control input
66 Rectifier
67 Output
68 Surge protector
69 Consumer
70 Apparatus for setpoint/actual value voltage comparison
71 Signal output
72 Processor
73 Input
74 Terminal
75 Output
76 Driver
77 MOSFET power stage
78 Power supply
79 Resistor
80 Inputs
81 Signal input
82 Processor
83 Signal input
84 Rectifier
85 Output
86 MOSFET
87 Distributor
88 Output
89 Input
90 Output
91 Output
92 MOSFET
93 Power supply
94 Output
95 Signal
96 First power transmission apparatus
97 Second power transmission apparatus
A Axis
B Assembly
S Hinge axis
PLE Primary power electronics system
SLE Secondary power electronics system
PSE Primary signal electronics system
SSE Secondary signal electronics system
PS Primary side
SS Secondary side

What is claimed is:

1. A method for transmitting electric power and signals between a wall and a leaf pivotally mounted on the wall, the method comprising:
   transmitting the electric power so as to be galvanically isolated via a power transmission apparatus; and
   transmitting the signals optically or optoelectronically via a first signal transmission apparatus and a second signal transmission apparatus,
   wherein,
   the power transmission apparatus comprises a primary coil assembly and a secondary coil assembly, and
   the primary coil assembly, the secondary coil assembly, the first signal transmission apparatus, and the second signal transmission apparatus each comprise a respective central axis which are respectively disposed so as to substantially coincide with a hinge axis.

2. The method as recited in claim 1, wherein
   the transmitting of the signals optically or optoelectronically is from the secondary side to the primary side.

3. The method as recited in claim 2, wherein the primary side is a side of the wall and the secondary side is a side of the leaf.

4. The method as recited in claim 2, wherein the transmission of the electric power so as to be galvanically isolated is performed as an inductive transmission,
   the method further comprising:
   providing a direct current voltage on the primary side; and
   converting the direct current voltage into an alternating current voltage for the inductive transmission.

5. The method as recited in claim 4, wherein the alternating current voltage has a frequency of between 10 and 300 kHz.

6. The method as recited in one of claim 2, further comprising:
   controlling the electric power on the primary side with the signals.

7. The method as recited in one of claim 2, further comprising:
   using the signals to transmit at least one of an operational status and a signal status from at least one of a secondary sensor, a detector and a detector group to an alarm system arranged on the primary side.

8. A device for transmitting electric power and signals between a wall and a leaf pivotally mounted about a hinge axis on the wall, the device comprising:
   a first power transmission apparatus configured to transmit electric power so as to be galvanically isolated;
   a first signal transmission apparatus configured to transmit at least one of an optical signal and an optoelectronic signal; and
   a second signal transmission apparatus configured to transmit at least one of an operational status and a signal status from a secondary side sensor, a secondary detector and a secondary detector group to a primary side alarm system,
   wherein,
   the first power transmission apparatus comprises a first primary coil assembly and a first secondary coil assembly, and
   the first primary coil assembly, the first secondary coil assembly, the first signal transmission apparatus, and the second signal transmission apparatus each comprise a respective central axis which are respectively disposed so as to substantially coincide with the hinge axis.

9. The device as recited in claim 8, wherein the first signal transmission apparatus comprises a light emitting diode and a photodiode or a phototransistor.

10. The device as recited in claim 8, wherein,
    the first power transmission apparatus is configured to provide a need-based electric power for a consumer on the leaf,
    the first signal transmission apparatus is configured to control the electric power provided by the first power transmission apparatus for the consumer, and
    further comprising:
    a second power transmission apparatus configured to provide a power required to operate at least one of a sensor, a detector, and a detector group.

* * * * *